United States Patent
Kalla et al.

(10) Patent No.: US 7,360,062 B2
(45) Date of Patent: Apr. 15, 2008

(54) METHOD AND APPARATUS FOR SELECTING AN INSTRUCTION THREAD FOR PROCESSING IN A MULTI-THREAD PROCESSOR

(75) Inventors: Ronald Nick Kalla, Round Rock, TX (US); Minh Michelle Quy Pham, Austin, TX (US); Balaram Sinharoy, Poughkeepsie, NY (US); John Wesley Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 10/424,530

(22) Filed: Apr. 25, 2003

(65) Prior Publication Data

US 2004/0215946 A1   Oct. 28, 2004

(51) Int. Cl.
 G06F 9/30     (2006.01)
 G06F 9/40     (2006.01)
 G06F 15/00    (2006.01)
 G06F 7/38     (2006.01)
 G06F 9/00     (2006.01)
 G06F 9/44     (2006.01)
 G06F 9/46     (2006.01)

(52) U.S. Cl. ............ 712/215; 712/206; 712/220; 712/245; 718/103

(58) Field of Classification Search ........ 718/100, 718/102–104, 108; 712/245, 214–215, 220, 712/206
See application file for complete search history.

(56) References Cited

U.S. PATENT DOCUMENTS 4,514,803 A * 4/1985 Agnew et al. .......... 703/26
4,642,756 A   2/1987 Sherrod
6,073,159 A   6/2000 Emer et al.
6,076,157 A * 6/2000 Borkenhagen et al. ...... 712/228
6,105,051 A * 8/2000 Borkenhagen et al. ...... 718/103

(Continued)

FOREIGN PATENT DOCUMENTS

EP   0 790 557 A2   8/1997

(Continued)

OTHER PUBLICATIONS

Borkenhagen et al., " A multithreaded PowerPC processor for commercial servers" Nov. 2000, IBM, pp. 885-898.*

(Continued)

Primary Examiner—William Thomson
Assistant Examiner—Qing-Yuan Wu
(74) Attorney, Agent, or Firm—Casimer Salys; Russell D. Culbertson; The Culbertson Group, P.C.

(57) ABSTRACT

The selection between instruction threads in a SMT processor for the purpose of interleaving instructions from the different instruction threads may be modified to accommodate certain processor events or conditions. During each processor clock cycle, an interleave rule enforcement component produces at least one base instruction thread selection signal that indicates a particular one of the instruction threads for passing an instruction from that particular thread into a stream of interleaved instructions. Thread selection modification is provided by an interleave modification component that generates a final thread selection signal based upon the base thread selection signal and a feedback signal derived from one or more conditions or events in the various processor elements. This final thread selection signal may indicate the same instruction thread indicated by the base thread selection signal or a different one of the instruction threads for passing an instruction into the interleaved stream of instructions.

10 Claims, 3 Drawing Sheets

U.S. PATENT DOCUMENTS

| | | | |
|---|---|---|---|
| 6,212,544 | B1 | 4/2001 | Borkenhagen et al. |
| 6,341,347 | B1 | 1/2002 | Joy et al. |
| 6,535,905 | B1 * | 3/2003 | Kalafatis et al. ............ 718/108 |
| 6,567,839 | B1 * | 5/2003 | Borkenhagen et al. ...... 718/103 |
| 6,658,447 | B2 | 12/2003 | Cota-Robles |
| 6,785,890 | B2 * | 8/2004 | Kalafatis et al. ............ 718/108 |
| 6,795,845 | B2 * | 9/2004 | Kalafatis et al. ............ 718/108 |
| 6,854,118 | B2 * | 2/2005 | Kalafatis et al. ............ 718/108 |
| 6,865,740 | B2 * | 3/2005 | Kalafatis et al. ............ 718/108 |
| 6,971,104 | B2 * | 11/2005 | Kalafatis et al. ............ 718/108 |
| 6,981,261 | B2 * | 12/2005 | Kalafatis et al. ............ 718/108 |
| 7,082,519 | B2 * | 7/2006 | Kelsey et al. ............... 712/228 |
| 7,120,783 | B2 * | 10/2006 | Fotland et al. .............. 712/228 |
| 2001/0056456 | A1 | 12/2001 | Cota-Robles |
| 2002/0002667 | A1 * | 1/2002 | Kelsey et al. ............... 712/228 |
| 2002/0103990 | A1 | 8/2002 | Potash |
| 2003/0009648 | A1 * | 1/2003 | Doing et al. ................ 711/202 |
| 2003/0018686 | A1 * | 1/2003 | Kalafatis et al. ............ 709/102 |
| 2003/0023658 | A1 * | 1/2003 | Kalafatis et al. ............ 709/102 |
| 2003/0154235 | A1 * | 8/2003 | Sager ......................... 709/108 |
| 2004/0215945 | A1 * | 10/2004 | Burky et al. ................ 712/245 |

FOREIGN PATENT DOCUMENTS

| | | |
|---|---|---|
| JP | 09-282184 | 10/1997 |
| JP | 10-124316 | 5/1998 |
| JP | 2000-020323 | 1/2000 |
| JP | 2001-306323 | 11/2001 |
| WO | WO 02/067116 A2 | 8/2002 |

OTHER PUBLICATIONS

Snavely et al., "Symbiotic Jobscheduling with Priorities for a Simultaneous Multitreading Processor," Feb. 12, 2002, Citeseer, pp. 1-24, Draft Document.

Snavely et al., "Symbiotic Jobscheduling for a Simultaneous Multitreading Processor," 2000, Citeseer, pp. 66-76.

Utiyama et al., "Design and Implementation of Multithreaded Processor for Real-Time Operation," Technical Report of IEICE (Mar. 22, 2000), pp. 29-36, vol. 99(725).

Fisk et al., "Thread-Prioritization: A Thread Scheduling Mechanism for Multiple-Context Parallel Processors," First International Symposium of High Performance Computer Architecture (Raleigh, NC, Jan. 1995), pp. 210-221.

Snavely et al., "Symbiotic Jobscheduling with Priorities for a Simultaneous Multitreading Processor," SIGMETRICS Conf. Measurement and Modeling of C.S. (Jun. 2002), pp. 66-76.

* cited by examiner

METHOD AND APPARATUS FOR SELECTING AN INSTRUCTION THREAD FOR PROCESSING IN A MULTI-THREAD PROCESSOR

RELATED APPLICATIONS

This application is related to application Ser. No. 10/424,533, entitled "METHOD AND APPARATUS FOR RANDOMIZING INSTRUCTION THREAD INTERLEAVING IN A MULTI-THREAD PROCESSOR," and application Ser. No. 10/424,529, entitled APPARATUS AND METHOD FOR ADJUSTING INSTRUCTION THREAD PRIORITY IN A MULTI-THREAD PROCESSOR," each filed simultaneously herewith. The entire content of each of these related applications is hereby incorporated by reference into the present application.

TECHNICAL FIELD OF THE INVENTION

This invention relates to data processors that process multiple, interleaved instruction threads on a cycle-by-cycle basis according to a priority rule. More particularly, the invention relates to selecting a particular instruction thread for processing based on events or conditions associated with the instruction threads.

BACKGROUND OF THE INVENTION

A number of techniques are used to improve the speed at which data processors execute software programs. These techniques include increasing the processor clock speed, using cache memory, and using predictive branching. Increasing the processor clock speed allows a processor to perform relatively more operations in any given period of time. Cache memory is positioned in close proximity to the processor and operates at higher speeds than main memory, thus reducing the time needed for a processor to access data and instructions. Predictive branching allows a processor to execute certain instructions based on a prediction about the results of an earlier instruction, thus obviating the need to wait for the actual results and thereby improving processing speed.

Some processors also employ pipelined instruction execution to enhance system performance. In pipelined instruction execution, processing tasks are broken down into a number of pipeline steps or stages. Pipelining may increase processing speed by allowing subsequent instructions to begin processing before previously issued instructions have finished a particular process. The processor does not need to wait for one instruction to be fully processed before beginning to process the next instruction in the sequence.

Processors that employ pipelined processing may include a number of different pipelines which are devoted to different activities in the processor. For example, a processor may process sequential instructions in a fetch stage, decode/dispatch stage, issue stage, execution stage, finish stage, and completion stage. Each of these individual stages may employ its own set of pipeline stages to accomplish the desired processing tasks.

Multi-thread instruction processing is an additional technique that may be used in conjunction with pipelining to increase processing speed. Multi-thread instruction processing involves dividing a set of program instructions into two or more distinct groups or threads of instructions. This multi-threading technique allows instructions from one thread to be processed through a pipeline while another thread may be unable to be processed for some reason. This avoids the situation encountered in single threaded instruction processing in which all instructions are held up while a particular instruction cannot be executed, such as, for example, in a cache miss situation where data required to execute a particular instruction is not immediately available. Data processors capable of processing multiple instruction threads are often referred to as simultaneous multithreading (SMT) processors.

It should be noted at this point that there is a distinction between the way the software community uses the term "multithreading" and the way the term "multithreading" is used in the computer architecture community. The software community uses the term "multithreading" to refer to a single task subdivided into multiple, related threads. In computer architecture, the term "multithreading" refers to threads that may be independent of each other. The term "multithreading" is used in this document in the same sense employed by the computer architecture community.

To facilitate multithreading, the instructions from the different threads are interleaved in some fashion at some point in the overall processor pipeline. There are generally two different techniques for interleaving instructions for processing in a SMT processor. One technique involves interleaving the threads based on some long latency event, such as a cache miss that produces a delay in processing one thread. In this technique all of the processor resources are devoted to a single thread until processing of that thread is delayed by some long latency event. Upon the occurrence of the long latency event, the processor quickly switches to another thread and advances that thread until some long latency event occurs for that thread or until the circumstance that stalled the other thread is resolved.

The other general technique for interleaving instructions from multiple instruction threads in a SMT processor involves interleaving instructions on a cycle-by-cycle basis according to some interleaving rule. A simple cycle-by-cycle interleaving technique may interleave instructions from the different threads on a one-to-one basis. For example, a two-thread SMT processor may take an instruction from a first thread in a first clock cycle, an instruction from a second thread in a second clock cycle, another instruction from the first thread in a third clock cycle and so forth, back and forth between the two instruction threads. A more complex cycle-by cycle interleaving technique may involve using software instructions to assign a priority to each instruction thread and then interleaving instructions from the different threads to enforce some rule based upon the relative thread priorities. For example, if one thread in a two-thread SMT processor is assigned a higher priority than the other thread, a simple interleaving rule may require that twice as many instructions from the higher priority thread be included in the interleaved stream as compared to instructions from the lower priority thread.

A more complex cycle-by-cycle interleaving rule in current use assigns each thread a priority from "1" to "7" and places an instruction from the lower priority thread into the interleaved stream of instructions based on the function $1/(2^{|X-Y|+1})$, where X=the software assigned priority of a first thread, and Y=the software assigned priority of a second thread. In the case where two threads have equal priority, for example, X=3 and Y=3, the function produces a ratio of ½, and an instruction from each of the two threads will be included in the interleaved instruction stream once out of every two clock cycles. If the threads' priorities differ by 2, for example, X=2 and Y=4, then the function produces a ratio of ⅛, and an instruction from the lower priority thread will be included in the interleaved instruction stream once out of every eight clock cycles.

Using a priority rule to choose how often instructions from particular threads are included in the interleaved instruction stream is generally intended to ensure that processor resources are allotted based on the priority of each thread. When instruction threads in a multithreading processor are at equal priorities, generally the instruction threads should share processor resources equally. However, there may be situations in a SMT processor in which one instruction thread will effectively use an inordinate share of processor resources even when the different instruction threads all have the same software assigned priority. This uneven use of processor resources when the instruction thread priorities are equal prevents the neglected instruction threads from advancing as intended and can reduce overall processing efficiency.

SUMMARY OF THE INVENTION

The present invention provides apparatus and methods for modifying the selection between instruction threads in a SMT processor for the purpose of interleaving instructions from the different instruction threads. During each processor clock cycle, an interleave rule enforcement component or circuit produces at least one base thread selection signal that indicates a particular one of the instruction threads for passing an instruction from that particular thread into a stream of interleaved instructions. According to the invention, an interleave modification component generates a final thread selection signal based upon the base thread selection signal and a feedback signal derived from one or more conditions or events in the various processor elements. This final thread selection signal may indicate the same instruction thread indicated by the base thread selection signal or a different one of the instruction threads for passing an instruction into the interleaved stream of instructions.

The adjustment or modification of instruction thread selection according to the invention has particular application in properly allotting processor resources between different instruction threads of equal or similar processing priority. According to one form of the invention, when the instruction threads have different or substantially different processing priorities, instructions from the different instruction threads are interleaved according to the interleave rule as enforced by the interleave rule enforcement component. When all of the instruction threads are equal or nearly equal in priority, however, the interleave modification component may choose a different instruction thread for adding an instruction to the interleaved stream rather than the instruction thread dictated by the rule. This modification of thread choice facilitates evening out the allotment of processor resources between instruction threads of similar priority.

A final thread selection signal according to the present invention may be applied directly to control the selection of instruction threads for the interleaving of instructions into the interleaved stream of instructions. One preferred form of the invention generates two final thread selection signals, each final thread selection signal corresponding to a respective base thread selection signal and a respective thread of instructions in the processor. The two final thread selection signals are combined in a output component to produce a selection control signal which can be used to select between the two instruction threads for passing an instruction into the interleaved stream of instructions.

In forms of the invention generating a final thread selection signal for each separate instruction thread in the processor, the modification component may be configured so that under certain circumstances each final selection signal indicates that the respective instruction thread is not to be selected for passing an instruction into the interleaved stream. In these forms of the invention, each final thread selection signal may be used as a hold signal and applied to a respective hold element in the processor to prevent a valid instruction from the respective instruction thread to pass into the interleaved stream to be processed.

There may be situations in which it is desirable to leave the base thread selection signal or signals unaffected by the modification component so that each final thread selection signal indicates the same thread indicated by the respective base thread selection signal. To accommodate these situations, preferred forms of the present invention include a feedback override component or circuit. Each feedback override component selectively overrides a respective feedback signal that would otherwise dictate a modification from the respective base thread selection signal to the respective final thread selection signal. For example, a feedback override component according to the invention may selectively override the respective feedback signal in the event that the thread priorities of the instruction threads to be interleaved are not equal.

These and other advantages and features of the invention will be apparent from the following description of the preferred embodiments, considered along with the accompanying drawings.

DESCRIPTION OF PREFERRED EMBODIMENTS

Figure 1:
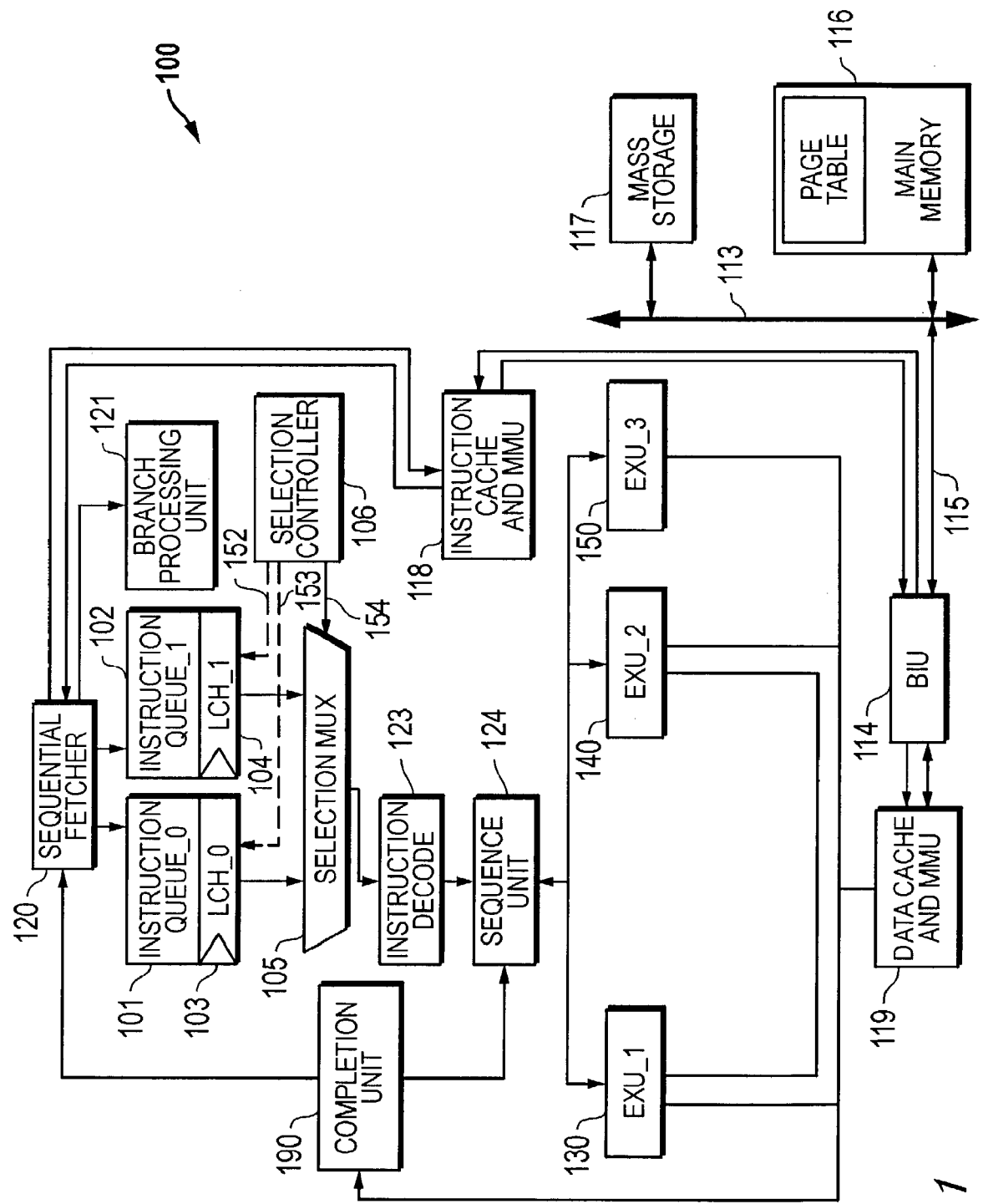
FIG. 1 is a block diagram of a processor including a thread selection arrangement according to the present invention.

FIG. 1 illustrates a processor 100 embodying the principles of the invention. Processor 100 accommodates multithreading and includes a first instruction queue 101 (Queue_0), a second instruction queue 102 (Queue_1), selection multiplexer (MUX) 105, and selection controller 106. Each instruction queue 101 and 102 is dedicated to handling instructions in a respective thread of instructions. More particularly, first instruction queue 101 queues instructions from a first instruction thread T0 while second instruction queue 102 queues instructions from a second instruction thread T1. A sequential fetcher 120 transfers instructions making up the two different instruction threads from instruction cache and memory management unit (MMU)118 to instruction queues 101 and 102. Instruction queues 101 and 102 ultimately feed their respective instructions to the two inputs of selection MUX 105. Selection controller 106 controls selection MUX 105 to interleave instructions from the two different instruction threads into a single interleaved stream of instructions for further processing.

As will be described further below with reference to FIGS. 2 and 3, each instruction thread is assigned a priority, and an interleave rule enforcement component included in selection controller 106 uses these priorities to enforce a rule regarding the frequency with which instructions from each queue (101 or 102) are placed in the interleaved stream for processing. The output of selection controller 106 comprises a control signal applied to thread selection control path 154. This control signal on thread selection control path 154 is applied to MUX 105 and specifies which input of the MUX is to be passed on for further processing during a particular clock cycle. Since each input of MUX 105 is coupled to an instruction queue containing instructions from different threads, selecting a particular input of MUX 105 has the effect of selecting a particular instruction thread for processing.

In the illustrative embodiment shown in FIG. 1, processor 100 comprises a single integrated circuit superscalar microprocessor. Accordingly, processor 100 includes various execution units, registers, buffers, memory devices, and other functional units, which are all formed by integrated circuitry. Of course, although the invention is described herein as applied to a microprocessor, the present selection controller arrangement is not limited to microprocessors and may be implemented in other types of processors. Also, the general processor arrangement shown in FIG. 1 is shown only for purposes of example in explaining the operation of selection controller 106 in relation to first instruction queue 101, second instruction queue 102, and selection MUX 105. Those skilled in the art will appreciate that the selection controller described and claimed in this document may be utilized in substantially any processor arrangement capable of supporting simultaneous multiple instruction thread processing.

The processor 100 shown in FIG. 1 is coupled to system bus 113 via bus interface unit (BIU) 114 and processor bus 115. Both system bus 113 and processor bus 115 include address, data, and control buses which are not shown separately. BIU 114 participates in bus arbitration to control the transfer of information between processor 100 and other devices coupled to system bus 113, such as main memory 116 and non-volatile mass storage 117. The data processing system illustrated in FIG. 1 preferably includes other devices coupled to system bus 113; however, these other devices are not necessary for an understanding of the invention and are accordingly omitted from the drawings so as not to obscure the invention in unnecessary detail.

BIU 114 is connected to instruction cache and MMU (memory management unit) 118 and data cache and MMU 119. High-speed caches, such as those within instruction cache and MMU 118 and data cache and MMU 119, enable processor 100 to achieve relatively fast access to a subset of data or instructions previously transferred from main memory 116 to the caches, thus improving the overall processing speed. Data and instructions stored within the data cache 119 and instruction cache 118, respectively, are each identified and accessed by an effective address, which is related to the real address of the respective data or instruction in main memory 116.

Instruction cache and MMU 118 is further coupled to sequential fetcher 120, which fetches instructions for execution from instruction cache and MMU 118 during each processor cycle. Sequential fetcher 120 transmits branch instructions fetched from instruction cache and MMU 118 to branch processing unit (BPU) 121 for execution, and temporarily stores sequential instructions in first instruction queue 101 and second instruction queue 102 for eventual transfer to instruction decode unit 123 for decoding, and sequencing unit 124 for dispatch to execution units 130, 140, or 150.

Sequential fetcher 120 feeds instructions to both first instruction queue 101 and second instruction queue 102. Both instruction queues 101 and 102 are configured to shift instructions down from one queue location to the next each time an instruction is issued through selection MUX 105 to decode unit 123 for further processing. The last storage element in first instruction queue 101 comprises a first latch 103 (LCH_0) and the last storage element in second instruction queue 102 comprises a second latch 104 (LCH_1). Latches 103 and 104 maintain the latched instructions available at the respective inputs of selection MUX 105 so that when one of the MUX inputs is selected, the instructions present at the selected input are transferred to instruction decode unit 123. Note the various elements illustrated, including latches 103 and 104, may be configured to handle only a single instruction at a time or multiple instructions. In a preferred form of the invention, various illustrated elements of processor 100 are capable of handling multiple instructions simultaneously. For example, each queue location in the instruction queues 101 and 102, and the latches 103 and 104 may include sufficient storage elements to accommodate five instructions. Thus, in this example, each instruction thread (T0 and T1) as well as the steam of interleaved instructions at the output of selection MUX 105 are actually five instructions wide. The invention encompasses any instruction width through threads T0 and T1.

The execution circuitry of processor 100 comprises the three separate execution units 130, 140, and 150 for executing sequential instructions. Each individual execution unit 130, 140, and 150, preferably executes instructions in a sequence of pipeline stages unique to the particular execution unit. Both the first execution unit 130 (EXU_1) and second execution unit 140 (EXU_2) in this example processor may be adapted to perform fixed-point mathematical and logical operations as well as load operations which load data from memory. The third execution unit 150 (EXU_3) in processor 100 may be adapted to perform complex fixed point operations. Third execution unit 150 may also perform store operations which store data to memory. Those skilled in the art will appreciate that various general purpose and floating point registers are associated with the execution units 130, 140, and 150 for temporarily storing operands and operation results. These registers are not shown in FIG. 1, since an understanding of their operation is not necessary for an understanding of the present selection controller arrangement. Numerous other elements may also be associated with execution units 130, 140, and 150, such as various queues, registers, or tables used to support out of order execution of instructions. These additional processor elements are also omitted from FIG. 1 so as not to obscure the invention in unnecessary detail.

Processor 100 processes each sequential instruction in distinct pipeline stages, namely, fetch, decode/dispatch, issue/sequence, execute, finish, and completion. Instructions from the two threads T0 and T1 stored in the two instruction queues 101 and 102, respectively, are interleaved into a single stream of instructions just prior to the decode/dispatch stage according to a priority rule enforced by selection controller 106. Because the instructions from the two threads are interleaved on a cycle-by-cycle basis prior to the decode/dispatch stage performed by decode unit 123, the stages beginning with decode/dispatch may receive an instruction from either thread on any given clock cycle. For example, in any given clock cycle processor 100 may be completing an instruction from a first thread at completion unit 190, executing instructions from either the first or second thread at execution units 130, 140, and 150, and decoding an instruction from the second thread. Simultaneously processing instructions from distinct threads allows processor 100 to continue processing instructions even if one of the instruction threads stalls due to a long latency event associated with an instruction in that particular thread. For example, assume that an instruction from thread T0 (queued through first instruction queue 101) suffers some long latency event that prevents it from being immediately processed. Because instructions from the second instruction thread T1 (queued through second instruction thread 102) are interleaved with the instructions from thread T0 those instructions may continue to be processed and pass through second instruction queue T1.

During the fetch stage, sequential fetcher 120 retrieves one or more instructions associated with one or more memory addresses from instruction cache and MMU 118. Sequential fetcher 120 stores sequential instructions fetched from instruction cache and MMU 118 in either first instruction queue 101 to be part of the first thread of instructions T0 or second instruction queue 102 to be part of the second thread of instructions T1. Branch instructions for both threads are removed or folded out by sequential fetcher 120 to BPU 121 for execution. BPU 121 includes a branch prediction mechanism (not shown separately) which, in one embodiment, comprises a dynamic prediction mechanism such as a branch history table (not shown). This branch history table enables BPU 121 to speculatively execute unresolved conditional branch instructions by predicting whether or not the branch will be taken.

Instructions passing through first and second instruction queues 101 and 102 are interleaved into a single stream of instructions that is delivered to instruction decode unit 123 for further processing. Instruction decode unit 123 decodes the instructions and passes the instructions to sequencing unit 124 for sequencing and dispatch to execution units 130, 140, and 150. Execution units 130, 140, and 150 execute instructions issued from sequencing unit 124. Once the issued instructions are fully executed, execution units 130, 140, and 150 store the results, if any, within the associated general purpose or other registers (not illustrated) and also notify completion unit 190 that the instructions have finished execution.

It will be appreciated that the particular processor structure shown in FIG. 1 is shown only for purposes of example, and that the modified thread selection according to the present invention is not limited to use with this particular structure. For example, although processor 100 shows branch instructions folded out of the instruction stream by sequential fetcher 120, other processor structures may treat the branch instruction unit as another execution unit along with the other execution units 130, 140, and 150. In any event, modified thread selection according to the present invention may be incorporated into substantially any simultaneous multi-thread processor.

It should also be noted that although the illustrated processor 100 is adapted to interleave two instruction threads T0 and T1 into a single interleaved stream for processing though the various processor pipeline stages after the fetch stage, other embodiments may be adapted to interleave more than two instruction threads into a single interleaved stream of instructions for processing. It will be noted that regardless of the number of instruction threads being simultaneously processed, an instruction (or set of instructions where the pipeline is multiple instructions wide) from only a single thread may generally be passed into the interleaved stream of instructions in any given clock cycle. Thus, where more than two threads are interleaved through a selecting device such as MUX 105, the apparatus must include logic for producing MUX control signals suitable for selecting a particular one of the threads for transfer through the MUX. In the two-thread form of the invention shown in FIG. 1, the MUX control signal may be applied through the signal path 154. However, control signals for a selection MUX having more than two inputs will require additional signal paths to accommodate the required MUX control signals.

Preferred embodiments of the present invention have the ability to hold instructions from one or both instruction threads T0 and T1 so that valid instructions from the respective held thread do not pass on for further processing. The hold capability may be implemented through hold signals applied to the two latches 103 and 104. FIG. 1 shows dashed lines 152 and 153 from selection controller 106 to the two latches 103 and 104. Selection controller 106 generates the required hold signal for each thread and applies the signal to the respective signal path 152 or 153. When applied to a respective latch 103 or 104, the hold signal causes the instruction or instructions stored in the respective latch to be marked as invalid for execution. Hold signals according to the invention will be discussed in more detail subsequently with reference to FIG. 3.

Figure 2:
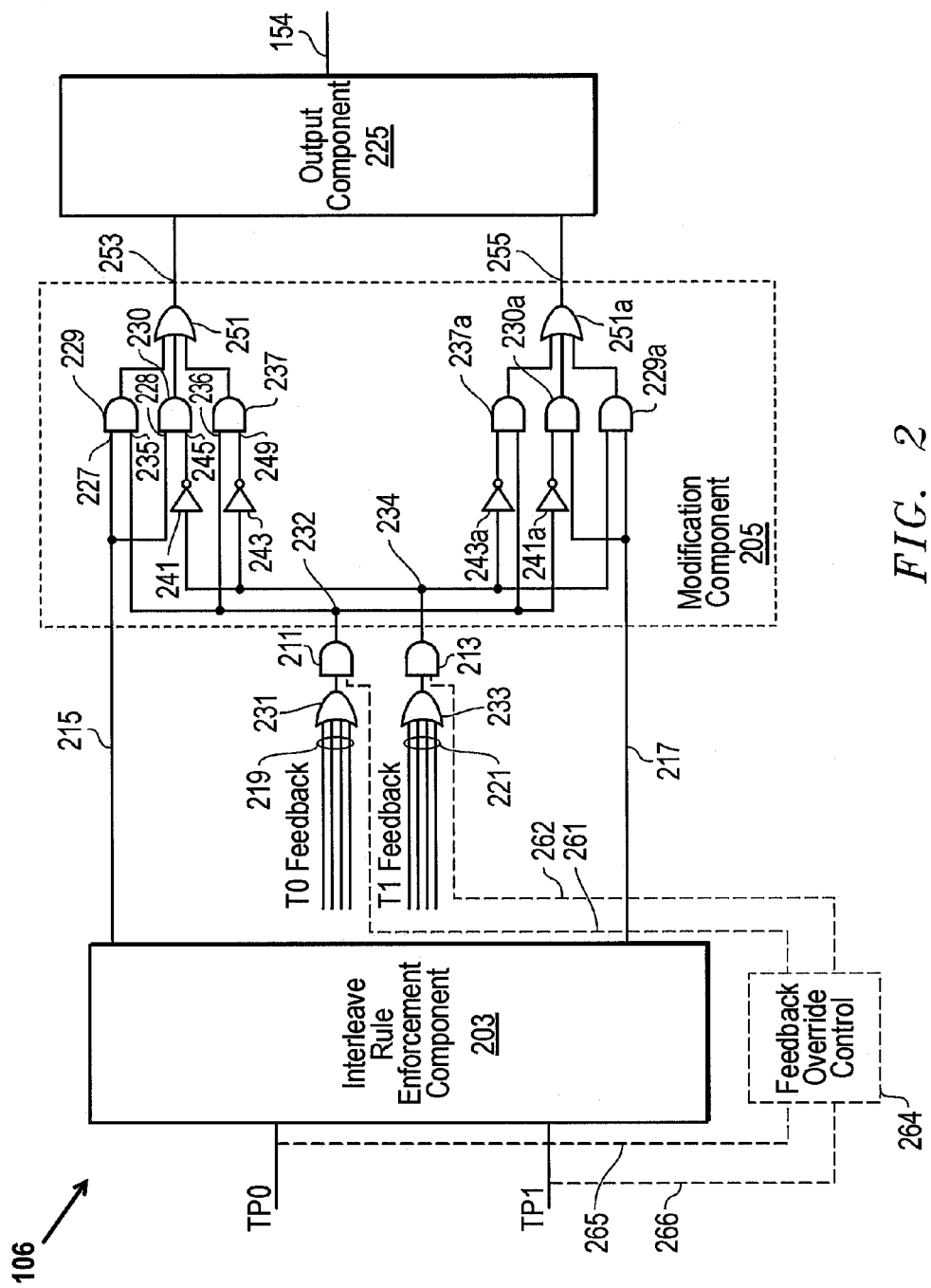
FIG. 2 is a combination block diagram and schematic diagram of one preferred form of thread selection controller in FIG. 1 including a thread selection modification component embodying the principles of the invention.

FIG. 2 illustrates a preferred selection controller 106 adapted for controlling the interleaving of instructions from two instruction threads. Selection controller 106 includes interleave rule enforcement component 203, a modification component 205, and a output component 225. Interleave rule enforcement component 203 provides two separate base thread selection signals to modification component 205, each signal associated with a different one of the instruction threads interleaved in processor 100. Modification component 205 generates a separate final thread selection signal for each base thread selection signal based upon the state of the base thread selection signal and feedback signals derived from events or conditions in other elements of the processor 100. The two final thread selection signals are combined by output component 225 to produce a single thread selection control signal to be used to select one of the two instruction threads in processor 100 for interleaving an instruction into the interleaved stream of instructions to be processed. Details of one preferred form of output component 225 will be described further below with reference to FIG. 3. The use of the final thread selection signals as hold signals for the respective instruction threads will also be discussed with reference to FIG. 3.

Referring particularly to FIG. 2, interleave rule enforcement component 203 receives priority signals TP0 and TP1 and applies two separate output signals at nodes 215 and 217. Priority signal TP0 indicates a priority assigned to instruction thread T0 and priority signal TP1 indicates a priority assigned to instruction thread T1. The two outputs generated by interleave rule enforcement component 203 and applied to nodes 215 and 217 comprise base thread selection signals, each associated with a particular thread. The base thread selection signal at node 215 is associated with thread T0 and comprises a binary signal that may be used to enforce an interleaving rule between the two threads based on the input priorities TP0 and TP1. The base selection signal at node 217 is associated with thread T1 and comprises a binary signal that is the complement of the signal at node 215, and thus may also be used to enforce the interleaving rule between the two threads. For example, a 0 level signal output from interleave rule enforcement component at node 215 for a given clock cycle may indicate that thread T0 is to be selected in that clock cycle for passing an instruction into the interleaved stream of instructions. The opposite logic signal at node 215 may indicate that thread T1 is to be selected in that clock cycle for passing an instruction into the interleaved instruction stream. In this example a 0 level signal at node 217 may indicate that thread T1 is to be selected in that clock cycle for passing an instruction into the interleaved instruction stream, while the opposite logic signal at node 217 may indicate that thread T0 is to be selected in that clock cycle.

Interleave rule enforcement component 203 may comprise any suitable component or circuit for producing the desired output signals indicating a particular instruction thread for enforcing the desired interleave rule. One preferred form of an interleave rule enforcement component suitable for use in conjunction with the present invention is discussed in detail in related application Ser. No. 10/424,533, entitled "METHOD AND APPARATUS FOR RANDOMIZING INSTRUCTION THREAD INTERLEAVING IN A MULTI-THREAD PROCESSOR," and application Ser. No. 10/424,529, entitled APPARATUS AND METHOD FOR ADJUSTING INSTRUCTION THREAD PRIORITY IN A MULTI-THREAD PROCESSOR," both of which are incorporated herein by reference. Further detail on interleave rule enforcement component 203 is omitted from this disclosure so as not to obscure the present invention in unnecessary detail.

Similar to the base thread selection signals at nodes 215 and 217, the final thread selection signals generated by modification component 205 at nodes 253 and 255 in FIG. 2 each indicate an instruction thread to be selected for passing an instruction into the interleaved instruction stream processing. The instruction thread indicated by the respective final thread selection signal, however, may be different from the instruction thread indicated by the base thread selection signal. In particular, modification component 205 may cause the state of a given final thread selection signal to be opposite to the state of the base thread selection signal in a given clock cycle in light of certain events or conditions in the various elements included in the processor. Thus, the present invention has the capability to modify the thread selection downstream from the interleave rule enforcement component in a cycle-by-cycle interleaved SMT processor to produce a more desirable allotment of processor resources between the competing instruction threads than may be possible by merely enforcing a priority rule between the instruction threads.

The modification component 205 in FIG. 2 receives the processor event or condition feedback through two sets of feedback input paths 219 and 221. Feedback input paths 219 are associated with thread T0 and feedback paths 221 are associated with thread T1 in the illustrated form of the invention. The signals on these two sets of feedback paths are combined by a respective OR gate 231 and 233 to produce the feedback signals that modification component 205 uses in conjunction with the base thread selection signals at nodes 215 and 217 to produce the two final thread selection signals at nodes 253 and 255. In one preferred form of the invention, the feedback signals are gated through AND gates 211 and 213 respectively under the control of feedback override signals as will be discussed further below.

The modification component 205 illustrated for purposes of example in FIG. 2 includes two branches corresponding to the two instruction threads T0 and T1 and the two base thread selection signals applied at nodes 215 and 217. This arrangement of separate branches facilitates the use of the final thread selection signals as hold signals as will be discussed below. The top branch of modification component 205 shown in FIG. 2 receives the signal at node 215 together with both feedback signals produced by OR gates 231 and 233 and ultimately applied at nodes 232 and 234. The signal at node 215 may be referred to as the T0 base thread selection signal and is applied to inputs 227 and 228 of AND gates 229 and 230, respectively. The feedback signal at node 232 is applied at input 235 of AND gate 229 and at input 236 of AND gate 237. The feedback signal at node 234 is inverted by inverters 241 and 243, and applied to input node 245 of AND gate 230 and input node 249 of AND gate 237. The outputs of AND gates 229, 230 and 237 are applied to the input of OR gate 251, so that if any one of the AND gates produces an asserted (logical 1 level) output signal, then the output node 253 of OR gate will also be asserted.

This arrangement of logic devices in the top branch of modification component 205 produces the following truth table referring to the signal levels at nodes 215, 232, 234, and 253.

TABLE 1

| | node 215 | node 232 | node 234 | node 253 |
|---|---|---|---|---|
| (1) | 0 | 0 | 0 | 0 |
| (2) | 0 | 0 | 1 | 0 |
| (3) | 0 | 1 | 0 | 1 |
| (4) | 0 | 1 | 1 | 0 |
| (5) | 1 | 0 | 0 | 1 |
| (6) | 1 | 0 | 1 | 0 |
| (7) | 1 | 1 | 0 | 1 |
| (8) | 1 | 1 | 1 | 1 |

Notice from the above truth table that the T0 base selection signal at node 215 and the final thread selection signal at node 253 differ in only two instances in this form of the invention. In the first instance, at line six of the table, the T0 base thread selection signal is equal to 1, which in this particular logic indicates that thread T0 is not initially selected for processing based simply on the interleave rule enforced by component 203. However, modification component 205 modifies the signal from the state at node 215 and produces a 0 level final thread selection signal at node 253 which indicates that the T0 thread is to be selected for introducing an instruction into the interleaved stream in that clock cycle. This occurs only when the signal at node 232 is at a logical 0 level while the signal at node 234 is at a logical 1 level. This signal at node 234 may be placed at the logical 1 level when any of the T1 feedback input paths are asserted indicating some event or condition associated with thread T1. Because the feedback inputs at 219 are all un-asserted indicating that thread T0 is processing normally, modification component 205 switches the T0 base thread selection signal at 215 to produce the 0 level final thread selection signal at node 253 indicating that the T0 instruction thread is to be selected in place of the T1 instruction thread.

The second instance is shown at line (3) of the table. In this instance the thread T0 is initially selected for processing as indicated by the logical 0 value base thread selection signal at node 215. However, because the feedback signal at node 232 is asserted to logical 1 level indicating some processor condition associated with thread T0 and because the feedback signal at node 234 is at a logical 0 level indicating no delaying processor condition associated with thread T1, modification component 205 produces a T0 thread final thread selection signal at node 253 that is opposite to T0 base thread selection signal and indicates that the T0 thread is not to be selected for passing an instruction to the interleaved stream.

It will be noted that the lower branch of modification component 205 shown in FIG. 2 including logic elements 229a, 230a, 237a, 251a, 241a, and 243a, exactly mirrors the top branch. Thus, a truth table associated with the logic of the lower branch of modification component 205 will exactly mirror the truth table given above for the top branch logic, and the final thread selection signals at nodes 253 and 255 will in all cases be complements of each other.

It should be noted that the present invention is by no means limited to the case where the final thread selection signals at nodes 253 and 255 will always be complements of each other. Alternative logic arrangements for modification component 205 may allow both final thread selection signals at nodes 253 and 255 to indicate that the respective thread is not to be selected for sending an instruction into the interleaved stream of instructions. This situation will be discussed in greater detail below with reference to FIG. 3. Also, it should be noted that the present invention is not limited to any particular feedback inputs in sets 219 and 221. The feedback signals may be asserted in response to some long latency event for an instruction such as a cache miss, or any other processor event that may make it preferable to modify the thread selection signals.

In a preferred form of the invention, the feedback signals output from OR gates 231 and are gated through AND gates 211 and 213, respectively. AND gates 211 and 213 are controlled by feedback override control signals on signal paths 261 and 262, respectively, to facilitate inhibiting or overriding the feedback signals. In particular, if the signals on paths 261 and 262 are asserted, that is, at a logical 1 level, then any asserted signal at any input in set 219 and 221 will ultimately be passed on to nodes 232 and 234. However, a low level logic signal at signal path 261 and 262 effectively blocks any high level signal from being passed on to nodes 232 and 234. Referring to the truth table above for the top branch of modification component, blocking a high level logic signal at nodes 232 and 234 prevents the branch from making the state of the final thread selection signal at node 253 different from the base thread selection signal at node 215. That is, overriding the feedback through gates 211 and 213 effectively causes modification component 205 to pass the base thread selection signals without alteration.

Although the form of the invention illustrated in FIG. 2 gates the feedback signals produced at the output of OR gates 231 and 233, alternate forms of the invention may gate the individual feedback input paths included in feedback input path sets 219 and 221. In these alternate forms of the invention, individual feedback input paths included in sets 219 and 221 would each include a separate gate similar to gates 211 and 213. Each of these individual feedback input path gates would be controlled by a respective control signal to effectively disable the respective feedback input path as desired while leaving other feedback input paths enabled. The control signals in any of the forms of the invention using gates or similar devices to disable one or more feedback paths 219 and 221 may be supplied through a software-controllable register.

In one form of the invention, a feedback override control component 264 is used to generate the signals on override signal paths 261 and 262. One particular application for overriding the feedback signals is in the situation where the input thread priorities are not equal. Thus, feedback override control 264 may receive the values of TP0 and TP1 as indicated by dashed lines 265 and 266 in FIG. 2, and include logic for providing high level logic signals to gates 211 and 213 only if TP0 is equal or nearly equal to TP1. Otherwise the logic of feedback override control 262 would produce low level, blocking signals on paths 261 and 262 to gates 211 and 213, respectively, effectively disabling the feedback signal at the output of OR gates 231 and 233. This process of disabling the feedback signal where the values of TP0 and TP1 are not equal prevents the thread selection frequencies dictated by large disparities in thread priorities from being effected by modification component 205.

Output component 225, the final sub-component of selection controller 106 shown in FIGS. 1 and 2, combines the final thread selection signals from nodes 253 and 255 and produces a selection control signal. This selection control signal is applied to signal path 154. As shown in FIG. 1, this signal on path 154 controls MUX 105 to select between the two instruction threads for interleaving instructions from the two threads.

Figure 3:
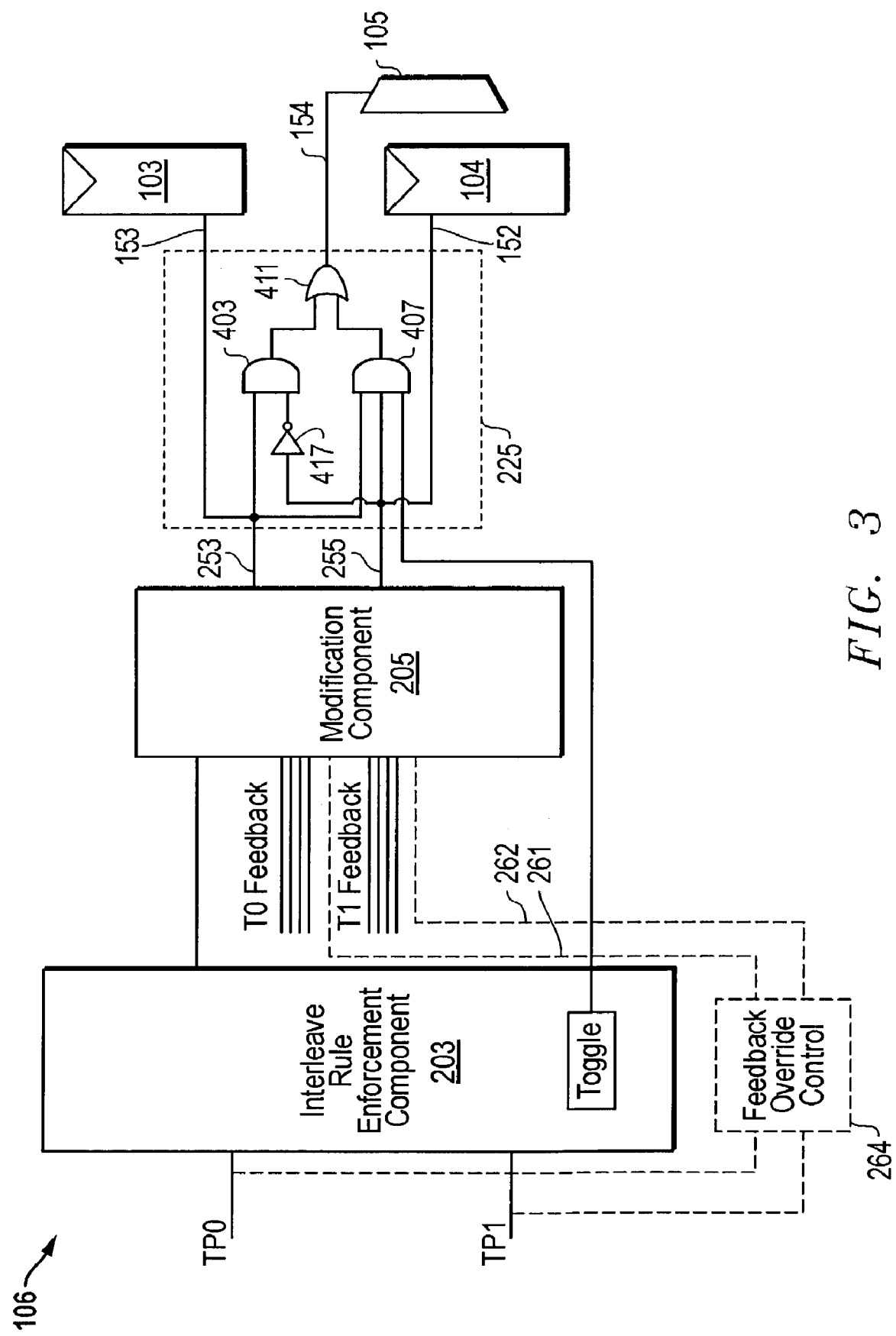
FIG. 3 is a combination block diagram and schematic diagram illustrating a selection control circuit according to the present invention.

FIG. 3 illustrates one preferred form of output component 225 used in selection controller 106. This particular output component 225 accommodates the situation in which the final thread selection signal at node 253 associated with thread T0 and the final thread selection signal at node 255 associated with thread T1 may both indicate that the respective thread should not be selected for processing, that is, both signals are at logical 1. The illustrated selection combination component 225 includes AND gate 403, AND gate 407, and OR gate 411. AND gate 403 is connected to receive the T0 final thread selection signal from node 253 and also connected to receive an inverted T1 final thread signal. This latter signal comprises the signal at node 255 after inversion through inverter 417. AND gate 407 is connected to receive the T0 final thread selection signal from node 253 and the T1 final thread selection signal from node 255. The third input to AND gate 407 comprises a toggle signal that toggles back and forth between logical states with each clock cycle. This signal may be derived from interleave rule enforcement component 203 as shown in FIG. 3, since the interleave rule enforcement component includes such a toggle signal generator. However, it will be appreciated that this toggle signal may be generated in any suitable fashion. The outputs of both AND gates 403 and 407 provide the inputs to OR gate 411, which performs a logical OR operation to generate the selection control signal on signal path 154, to be applied to MUX 105 (also shown in FIG. 1).

Under the logic applied in the illustrated form of the invention, a 0 level final thread selection signal indicates that the respective thread associated with the signal is to be selected for including an instruction in the interleaved stream in that particular clock cycle. It should also be noted that the signals at nodes 253 and 255 may be complementary signals or may both be at a logical 1 level. However, the signals at nodes 253 and 255 will never be both at a logical 0 level. With the logic of the illustrated output component 225, the signal on path 154 will follow the signal at node 253 except when both node 253 and 255 are at logical 1. In that case the toggle signal at gate 407 forces the signal output on path 154 to switch back and forth between logical 0 and 1 as long as the signals at nodes 253 and 255 remain both at logical level 1.

Particularly in implementations of the invention in which both final thread selection signals may indicate that the respective thread is not to be selected in that clock cycle, it may be advantageous to apply the final thread selection signals (nodes 253 and 255 in FIG. 3) as hold signals to instructions from the queues 101 and 102 in FIG. 1. Such a hold capability would prevent valid instructions from the queues 101 and 102 from entering the interleaved instruction stream through MUX 105 as it toggles back and forth between the two instruction threads under the control of the selection signal from output component 225 as discussed in the previous paragraph. Thus, the form of the invention shown in FIG. 3 applies the T0 final thread selection signal at node 253 to a hold input of latch 103 through hold signal path 153. Similarly the T1 final thread selection signal at node 255 is applied to a hold input of latch 104 through hold signal path 152. Note latches 103 and 104 in FIG. 1 comprise the final location in the queues 101 and 102, respectively. Each of the latches 103 and 104 responds to an asserted (logic level 1) hold signal by setting the one or more storage locations in the respective latch to an invalid state. Thus, although the data for one or more instructions is held in the respective latch and driven to MUX 105, and even driven into the interleaved stream of instructions when the MUX selects the output from that particular latch, the instructions indicated as invalid will not be fully processed. Latches 103 and 104 therefor serve as hold elements even though the invalid instructions will still be "visible" to the various processor elements. This ability to interleave invalid instructions into the interleaved stream may be helpful in some circumstances.

The following example helps illustrate the operation of the final thread selection signals at nodes 253 and 255 as hold signals while still participating in controlling the thread selection MUX 105. Assume both the T0 and T1 instruction threads are to be held because of processing problems indicated by feedback. Both signals will be at a logic level 1 in the illustrated implementation of the invention. These high level logic signals will also be applied to latches 103 and 104, thereby setting the latches to indicate that the latched instructions are not valid for execution. Even though both the T0 and T1 final thread selection signals at nodes 253 and 255 are at a high logical level, indicating that instructions from neither thread are to be passed on for processing, the toggle input to AND gate 407 forces the output at path 154 to switch back and forth between the two inputs to selection MUX 105. Thus, the instructions held in each latch 103 and 104 are passed on into the interleaved stream while both threads are held. However, the instructions are not processed because they are indicated as invalid as they progress through the processor.

It should be noted that the invention encompasses embodiments in which the final thread selection signals for the various threads are mutually exclusive, so that an instruction from one thread will selected in each clock cycle for interleaving an instruction into the interleaved stream. In these embodiments, it will not be necessary to apply the final thread selection signals also as hold signals to the latches associated with the instruction queues. Rather, the final thread selection signals will be used in these embodiments solely for generating the selection control signal for the selection MUX such as MUX 105 in FIG. 1. Exclusivity between instruction threads also may facilitate dispensing with the dual instruction branch arrangement shown in FIGS. 2 and 3 of this document and in the related applications that are incorporated herein by reference.

The above described preferred embodiments are intended to illustrate the principles of the invention, but not to limit the scope of the invention. Various other embodiments and modifications to these preferred embodiments may be made by those skilled in the art without departing from the scope of the following claims. For example, the logic and other circuitry illustrated provide specific examples of how the disclosed invention can be implemented, but the disclosed circuits may be implemented in positive or negative logic. Also, different combinations of logic gates could be used to achieve the same results, and such changes should be considered equivalents of the structure disclosed. Modifications to the various methods disclosed for interleaving instruction threads may be made to make the invention compatible with different processor types and architectures without departing from the scope of the present invention. In particular, although two-thread SMT processing arrangements are described above and illustrated in the drawings, the invention is by no means limited to SMT processors capable of processing only two instruction threads. Rather, modified thread selection according to the present invention may be used with any SMT processor using cycle-by-cycle interleave rule enforcement.

The invention claimed is:

1. A method for controlling cycle-by-cycle interleaving of instructions between a number of instruction threads in a simultaneous multithreading processor, the method including the steps of:
   (a) generating a base thread selection signal based at least partially on an interleaving rule which specifies a relative frequency at which instructions are to be taken from each of the number of instruction threads, the base thread selection signal indicating a first instruction thread for processing from among the number of instruction threads;
   (b) applying a feedback signal associated with one of the instruction threads included in the number of instruction threads as a first input and applying the base thread selection signal as a second input in generating a final thread selection signal, the final thread selection signal indicating a particular instruction thread included in the number of instruction threads;
   (c) generating an additional base thread selection signal based at least partially on the interleaving rule, the additional base thread selection signal indicating an additional instruction thread for processing from among the number of instruction threads;
   (d) applying an additional feedback signal associated with one of the instruction threads included in the number of instruction threads as an additional first input and applying the additional base thread selection signal as a second additional input in generating an additional final thread selection signal, the additional final thread selection signal indicating a respective instruction thread included in the number of instruction threads; and
   (e) combining the final thread selection signal and the additional final thread selection signal to produce a thread selection MUX control signal, and applying the thread selection MUX control signal to effect a selection of one of the number of instruction threads for interleaving an instruction into an interleaved stream of instructions.

2. The method of claim 1 wherein the additional base thread selection signal is the binary complement of the base thread selection signal.

3. The method of claim 1 further including the steps of:
   (a) applying the final thread selection signal to a first thread hold input associated with the first instruction thread; and
   (b) applying the additional final thread selection signal to an additional thread hold input associated with the additional instruction thread.

4. The method of claim 1 wherein the feedback signal is associated with the first instruction thread.

5. The method of claim 1 further including the step of overriding the feedback signal when the number of instruction threads have different processing priorities.

6. A method for controlling cycle-by-cycle interleaving of instructions between a number of instruction threads in a simultaneous multithreading processor, the method including the steps of:

(a) receiving a base thread selection signal based at least in part on an interleaving rule which specifies a relative frequency at which instructions are to be taken from each of the number of instruction threads, the base thread selection signal indicating a first instruction thread for processing from among the number of instruction threads;

(b) receiving a feedback signal from an instruction processing element, the feedback signal being associated with one of the instruction threads included in the number of instruction threads;

(c) applying the feedback signal as a first input and applying the base thread selection signal as a second input in generating a final thread selection signal, the final thread selection signal indicating a particular instruction thread included in the number of instruction threads;

(d) receiving an additional base thread selection signal based at least in part on the interleaving rule, the additional base thread selection signal indicating an additional instruction thread for processing from among the number of instruction threads;

(e) receiving an additional feedback signal from a respective instruction processing element, the additional feedback signal being associated with one of the instruction threads included in the number of instruction threads;

(f) applying the additional feedback signal as a first additional input and applying the additional base thread selection signal as a second additional input in generating an additional final thread selection signal, the additional final thread selection signal indicating a respective instruction thread included in the number of instruction threads; and (g) combining the final thread selection signal and the additional final thread selection signal to produce a thread selection MUX control signal, and applying the thread selection MUX control signal to effect a selection of one of the number of instruction threads for interleaving an instruction into an interleaved stream of instructions.

7. The method of claim 6 wherein the additional base thread selection signal is the binary complement of the base thread selection signal.

8. The method of claim 6 further including the steps of:

(a) applying the final thread selection signal to a first thread hold input associated with the first instruction thread; and (b) applying the additional final thread selection signal to an additional thread hold input associated with the additional instruction thread.

9. The method of claim 6 wherein the feedback signal is associated with the first instruction thread.

10. The method of claim 6 further including the step of overriding the feedback signal when the number of instruction threads have different processing priorities.

* * * * *